US008845427B2

(12) United States Patent
Timperley

(10) Patent No.: US 8,845,427 B2
(45) Date of Patent: Sep. 30, 2014

(54) GAMING SYSTEM AND METHOD OF GAMING

(75) Inventor: David Keith Timperley, Randwick (AU)

(73) Assignee: Aristocrat Technologies Australia Pty Limited (AU)

( * ) Notice: Subject to any disclaimer, the term of this patent is extended or adjusted under 35 U.S.C. 154(b) by 676 days.

(21) Appl. No.: 12/502,363

(22) Filed: Jul. 14, 2009

(65) Prior Publication Data

US 2010/0009748 A1 Jan. 14, 2010

(30) Foreign Application Priority Data

Jul. 14, 2008 (AU) ................................ 2008903590

(51) Int. Cl.
*A63F 13/08* (2006.01)
*G07F 17/32* (2006.01)

(52) U.S. Cl.
CPC ........ *G07F 17/3267* (2013.01); *G07F 17/3216* (2013.01); *G07F 17/3244* (2013.01)
USPC ................... 463/31; 463/16; 463/20; 463/32; 463/46; 463/47

(58) Field of Classification Search
USPC ........... 463/16, 20, 17, 18, 19, 30–33, 40–42, 463/46, 47
See application file for complete search history.

(56) References Cited

U.S. PATENT DOCUMENTS 5,088,737 A * 2/1992 Frank et al. ..................... 463/18
5,380,007 A * 1/1995 Travis et al. .................... 463/18
5,537,212 A 7/1996 Kelly et al.
5,575,478 A 11/1996 Lamberti et al.
5,667,459 A 9/1997 Su
6,083,105 A 7/2000 Ronin et al.
6,311,974 B1 11/2001 Koga
6,869,076 B1 3/2005 Moore et al.
6,869,359 B1 3/2005 Mathews
7,070,505 B2 * 7/2006 Vancura et al. ................. 463/25
7,241,220 B2 * 7/2007 Rothkranz et al. .............. 463/20
7,347,780 B1 3/2008 Best
7,369,013 B2 5/2008 Fazzio
7,413,511 B2 * 8/2008 Seelig et al. .................... 463/22
7,488,253 B2 * 2/2009 Nordman et al. ............... 463/31
7,572,185 B2 * 8/2009 Seelig et al. .................... 463/32
7,959,152 B2 * 6/2011 Seelig et al. .................... 463/22
2001/0024969 A1 9/2001 Jones et al.
2002/0077168 A1 6/2002 Jones et al.
2002/0082072 A1 6/2002 Seelig et al.
2003/0069061 A1 4/2003 Seelig et al.
2003/0224885 A1 12/2003 Leal et al.
(Continued)

FOREIGN PATENT DOCUMENTS

AU 199228327 11/1992
AU 2003200162 2/2004
(Continued)

*Primary Examiner* — Ronald Laneau
*Assistant Examiner* — Ross Williams
(74) *Attorney, Agent, or Firm* — McAndrews, Held & Malloy, Ltd.

(57) ABSTRACT

A gaming system comprising: a game controller; and a housing having a display and an enclosure containing a plurality of physical objects capable of movement with or within the enclosure; and a reader that identifies an object from the plurality of objects and communicates data regarding that object to the game controller.

23 Claims, 12 Drawing Sheets

(56) References Cited

U.S. PATENT DOCUMENTS

| | | | | |
|---|---|---|---|---|
| 2004/0082377 | A1 | 4/2004 | Seelig et al. | |
| 2004/0142737 | A1 | 7/2004 | Gauselmann | |
| 2004/0147305 | A1 | 7/2004 | Seelig et al. | |
| 2004/0180712 | A1 | 9/2004 | Forman et al. | |
| 2004/0224749 | A1 | 11/2004 | Seelig et al. | |
| 2005/0035542 | A1 | 2/2005 | Hosaka | |
| 2005/0037851 | A1 | 2/2005 | Evers | |
| 2005/0051964 | A1* | 3/2005 | Nordman | 273/292 |
| 2005/0261057 | A1 | 11/2005 | Bleich et al. | |
| 2006/0287048 | A1 | 12/2006 | Seelig et al. | |
| 2007/0004487 | A1 | 1/2007 | Imura | |
| 2007/0026948 | A1 | 2/2007 | Seelig et al. | |
| 2007/0049370 | A1 | 3/2007 | Watanabe | |
| 2007/0117603 | A1 | 5/2007 | Seelig et al. | |
| 2007/0243923 | A1* | 10/2007 | Seelig et al. | 463/16 |
| 2008/0039175 | A1* | 2/2008 | Tessmer et al. | 463/20 |
| 2008/0146331 | A1* | 6/2008 | Nordman et al. | 463/31 |
| 2010/0227677 | A1* | 9/2010 | Baerlocher | 463/27 |
| 2011/0212760 | A1* | 9/2011 | Rodgers et al. | 463/20 |
| 2012/0122571 | A1* | 5/2012 | DeSimone et al. | 463/31 |

FOREIGN PATENT DOCUMENTS

| | | | |
|---|---|---|---|
| CA | 2592913 | A1 | 12/2007 |
| CN | 1454688 | | 11/2003 |
| DE | 3638100 | | 5/1988 |
| EP | 1363253 | A2 | 11/2003 |
| EP | 1531434 | A2 | 5/2005 |
| GB | 190315138 | | 5/1904 |
| GB | 529271 | | 11/1940 |
| GB | 2242052 | | 9/1991 |
| GB | 2414545 | | 11/2005 |
| JP | 4183485 | | 6/1992 |
| JP | 6063220 | | 3/1994 |
| JP | 7111612 | | 4/1995 |
| JP | 2000037505 | | 2/2000 |
| JP | 2000140267 | A | 5/2000 |
| JP | 2000140286 | | 5/2000 |
| JP | 2001347007 | | 12/2001 |
| JP | 2003062263 | | 3/2003 |
| JP | 2003159440 | | 6/2003 |
| JP | 2003190404 | | 7/2003 |
| JP | 2003190405 | | 7/2003 |
| JP | 20030190406 | A1 | 7/2003 |
| JP | 2004016729 | | 1/2004 |
| JP | 2006095338 | | 4/2006 |
| JP | 2006230865 | | 9/2006 |
| SI | 22241 | | 10/2007 |
| WO | 0074798 | | 12/2000 |
| WO | 2004023883 | | 3/2004 |
| WO | 2004024249 | | 3/2004 |
| WO | 2004047933 | | 6/2004 |
| WO | 2005014130 | A2 | 2/2005 |
| WO | 2005035081 | | 4/2005 |
| WO | 2007024923 | A2 | 3/2007 |
| WO | 2007032784 | A1 | 3/2007 |
| WO | 2007077449 | A1 | 7/2007 |

* cited by examiner

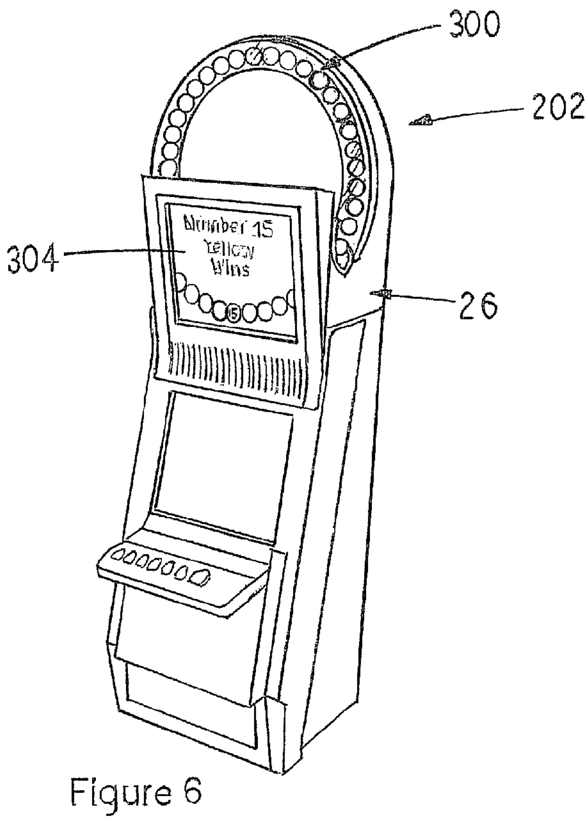
Figure 6
Figure 7
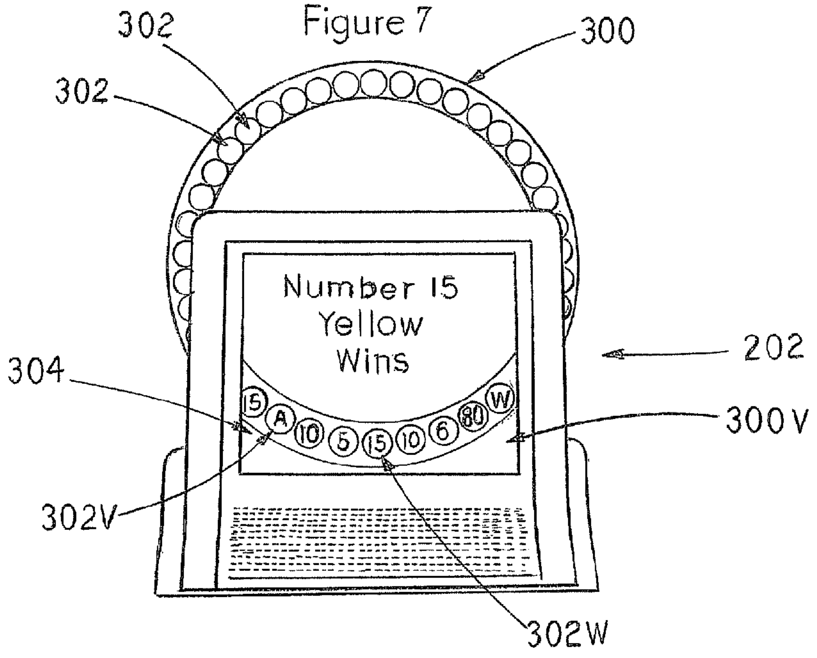

Figure(13a)
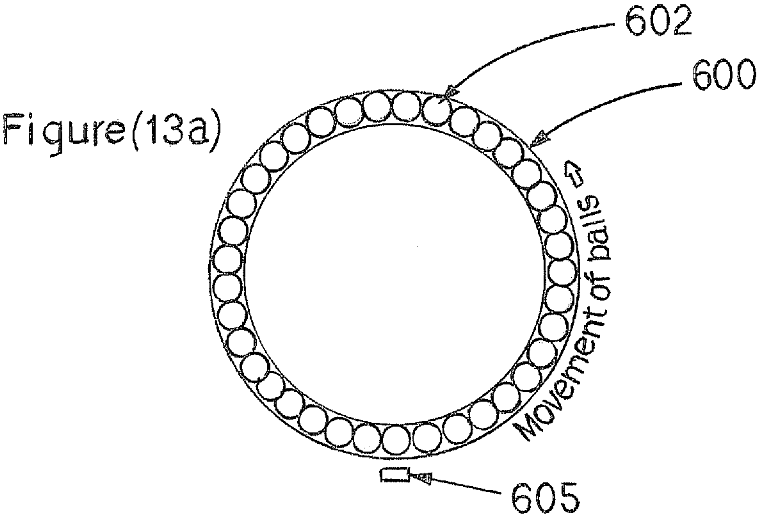
Figure(13b)
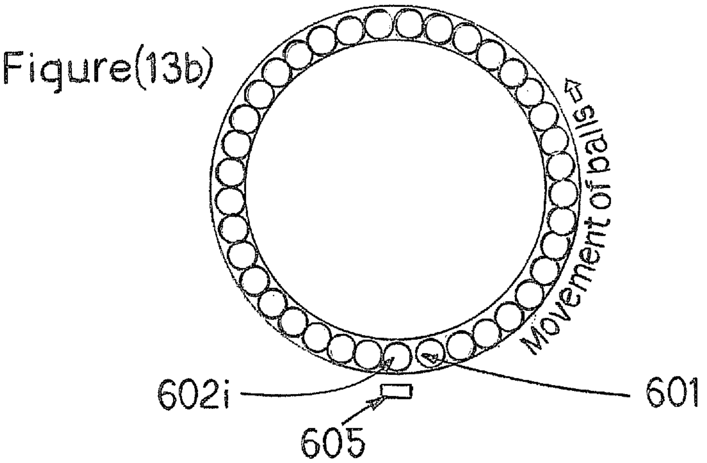
Figure(13c)
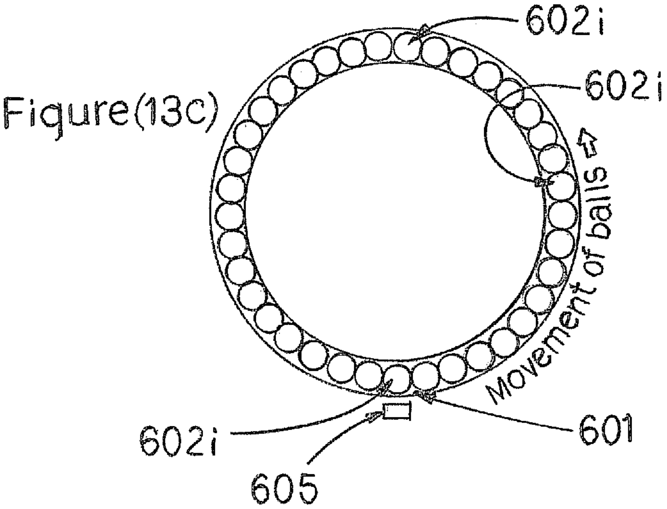

GAMING SYSTEM AND METHOD OF GAMING

RELATED APPLICATIONS

This application claims priority to Australian Provisional Patent Application No. 2008903590 having a filing date of Jul. 14, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system and a method of gaming.

Gaming machines are available in a wide variety of styles and game plays. Such machines may include physical reels carrying symbols and/or a video display where symbols are displayed virtually whether represented as reels or otherwise, for example as a Keno or Pachinko game.

Many users of gaming machines enjoy a mechanical interaction with their game playing and as such some machines are provided with mechanical side levers that players can pull to trigger a game. Another type of gaming machine may include a transparent lotto sphere mounted on the machine housing and containing lotto or 'Keno' balls randomly agitating inside the sphere.

While such gaming machines provide users with enjoyment, a need exists for alternative gaming machines in order to maintain or increase player enjoyment.

BRIEF SUMMARY OF THE INVENTION

In accordance with the present invention there is provided a gaming system comprising:

a game controller; and a housing having a display and an enclosure containing a plurality of physical objects capable of movement with or within the enclosure; and a reader that identifies an object from the plurality of objects and communicates data regarding that object to the game controller.

In accordance with the present invention there is further provided a method of gaming comprising:

moving marked physical objects within or with an enclosure mounted on the housing of a gaming machine;

reading at least one physical object to obtain data regarding that physical object and communicating that data to a game controller.

In accordance with the present invention there is still further provided a method of gaming comprising:

moving physical objects within or with an enclosure mounted on the housing of a gaming machine;

selecting an object and causing the object to change in physical appearance for a period of time.

In accordance with the present invention there is still further provided a gaming system comprising:

a game controller; and a housing having a display and an enclosure containing a plurality of physical objects capable of movement with or within the enclosure; and a differentiator that causes an object to change physical appearance for a period of time.

BRIEF DESCRIPTION OF SEVERAL VIEWS OF THE DRAWINGS

In order that the invention may be more clearly ascertained, embodiments will now be described by way of example and with reference to the accompanying drawings, in which:

FIG. 6 is an isometric view of a gaming machine according to an embodiment of the invention;

FIG. 7 is a front view of an upper part of the gaming machine of FIG. 6;

FIG. 10(*b*) is a side view of an upper part of the gaming machine according to FIG. 10*a;*

FIGS. 13(*a*), 13(*b*) and 13(*c*) are schematic diagrams of the visual display illustrating steps in charging an object according to an embodiment of the invention.

DETAILED DESCRIPTION OF THE INVENTION

The present invention incorporates mechanical outcomes in the electronic gaming system of a gaming machine in that a result or selection from a physical component, or mechanical aspect, of a gaming machine is recognized and used in game play. A mechanical aspect of the gaming machine generally comprises physical objects moving randomly, or seemingly moving randomly, within an enclosure, for example Keno balls agitating within a spherical container.

In one embodiment interaction between a physical aspect and an electronic aspect of a gaming machine is achieved by assigning an identifier to some or each physical object, selecting a physical object and identifying the properties of that physical object, and using the information regarding the properties during game play to award a prize, bonus game, etc.

In another embodiment the electronic aspect of the gaming machine selects an object and causes the object to change physical appearance for a period of time before the object returns to its original appearance. Examples of a change in appearance may include illuminating a ball or changing its colour. The ball with the altered appearance can then be used in game play as a bonus feature, etc.

In general, the gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
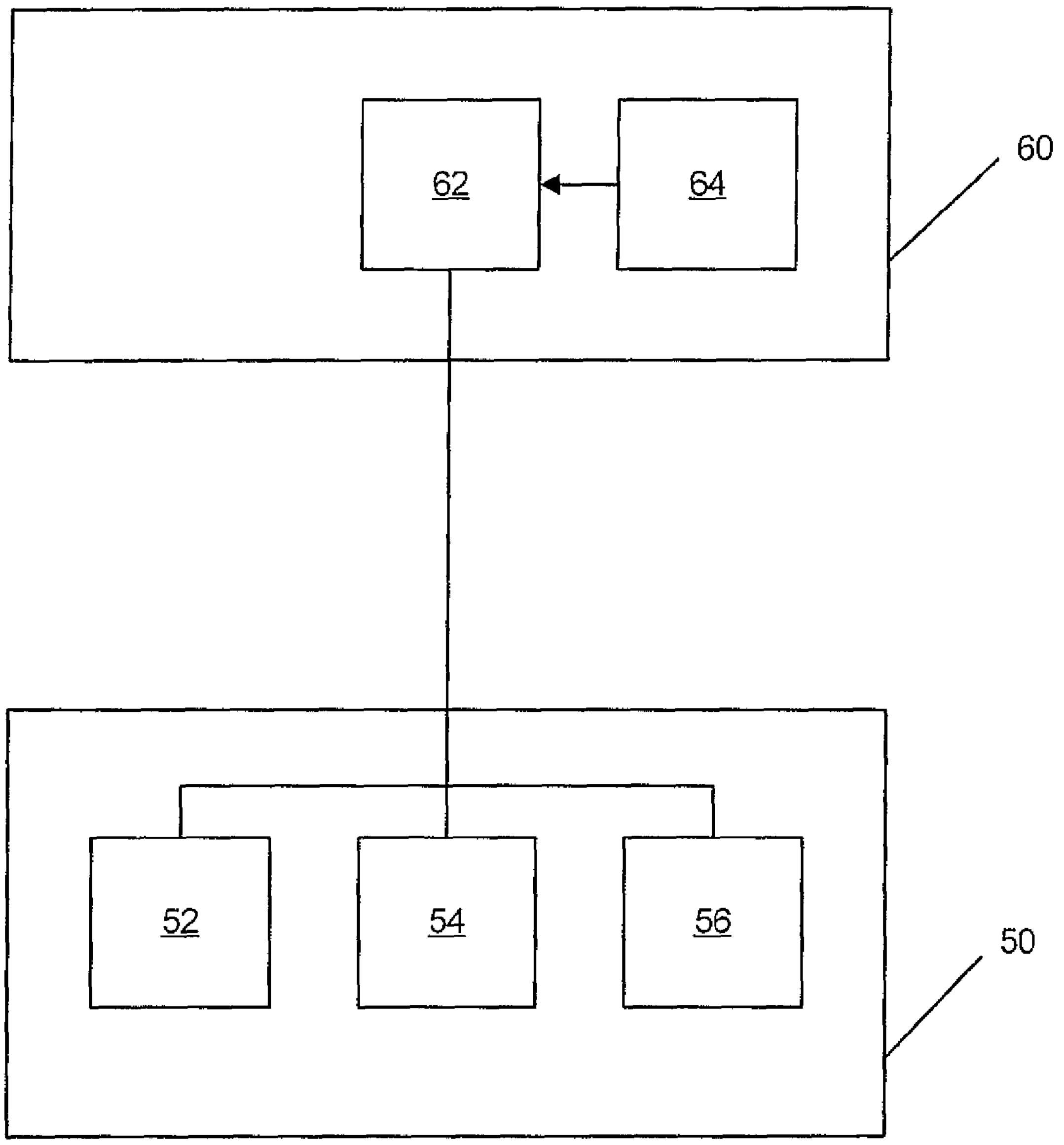
FIG. 1 is a block diagram of the core components of a gaming system according to an embodiment of the invention.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
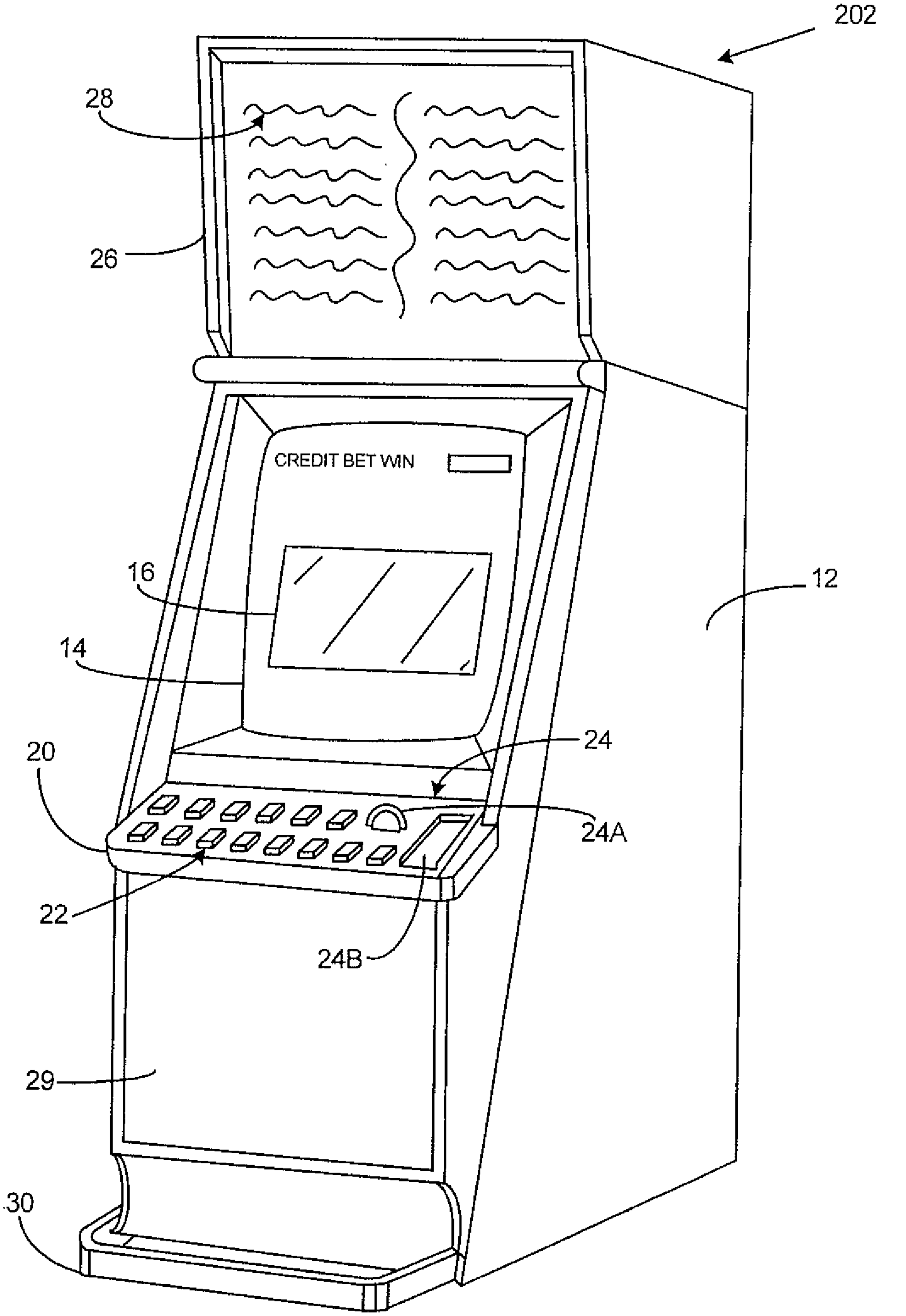
FIG. 2 is a perspective view of a stand alone gaming machine.

A gaming system in the form of a stand alone gaming machine 202 is illustrated in FIG. 2. The gaming machine 202 includes a console 12 having a display 14 on which is displayed representations of a game 16 that can be played by a player. A mid-trim 20 of the gaming machine 202 houses a bank of buttons 22 for enabling a player to interact with the gaming machine, in particular during gameplay. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 202.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
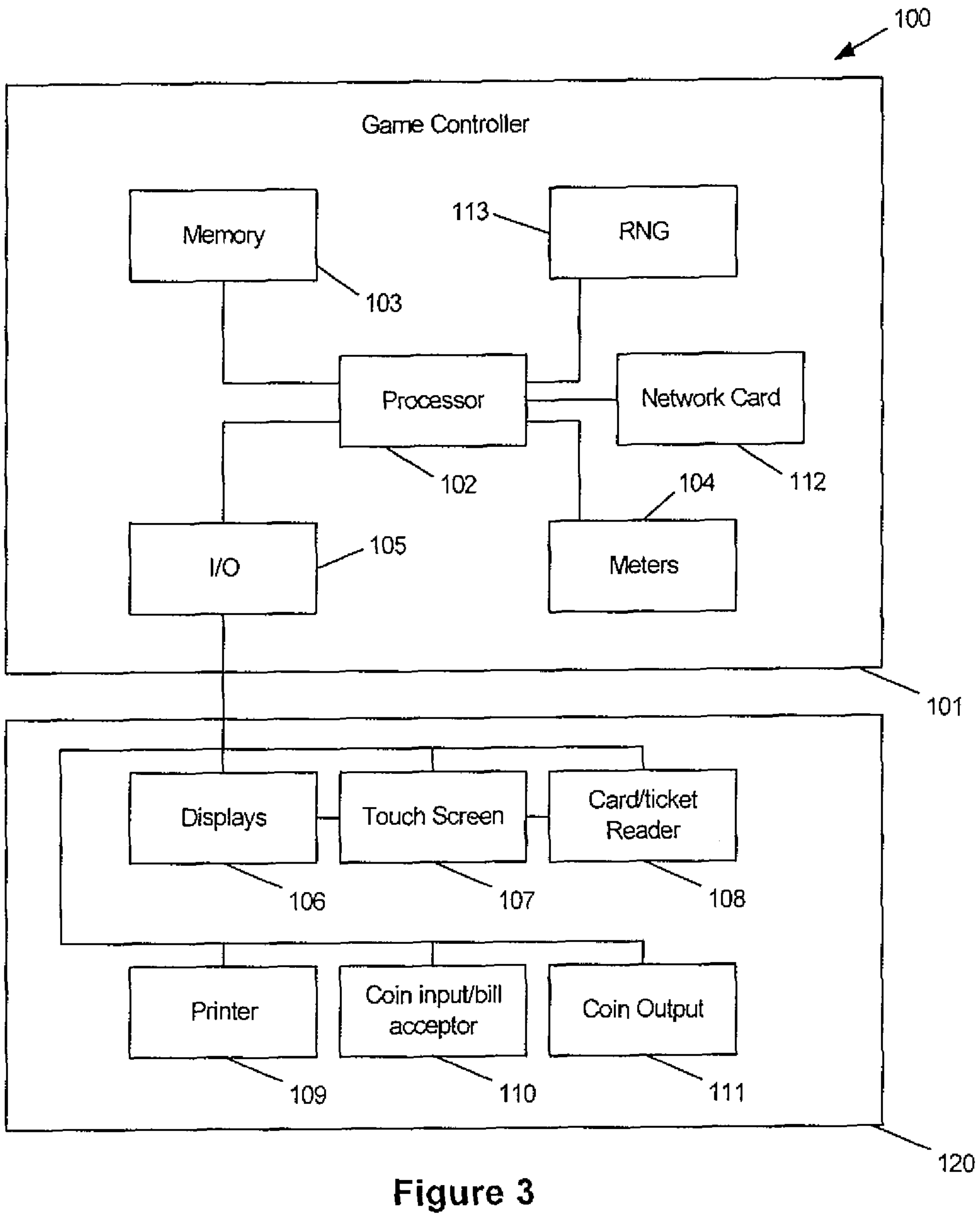
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
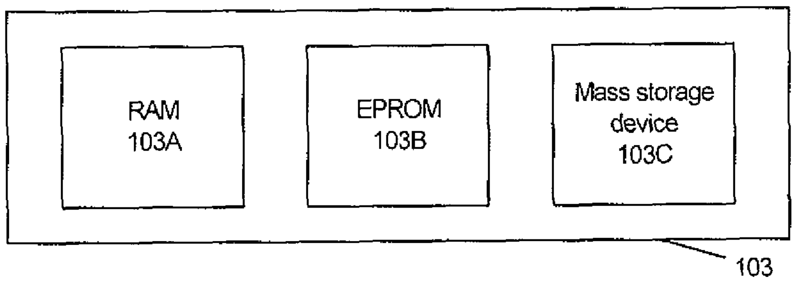
FIG. 4 is a block diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/ output devices 106,107,108,109,110,111 to be provided remotely from the game controller 101.

Figure 5:
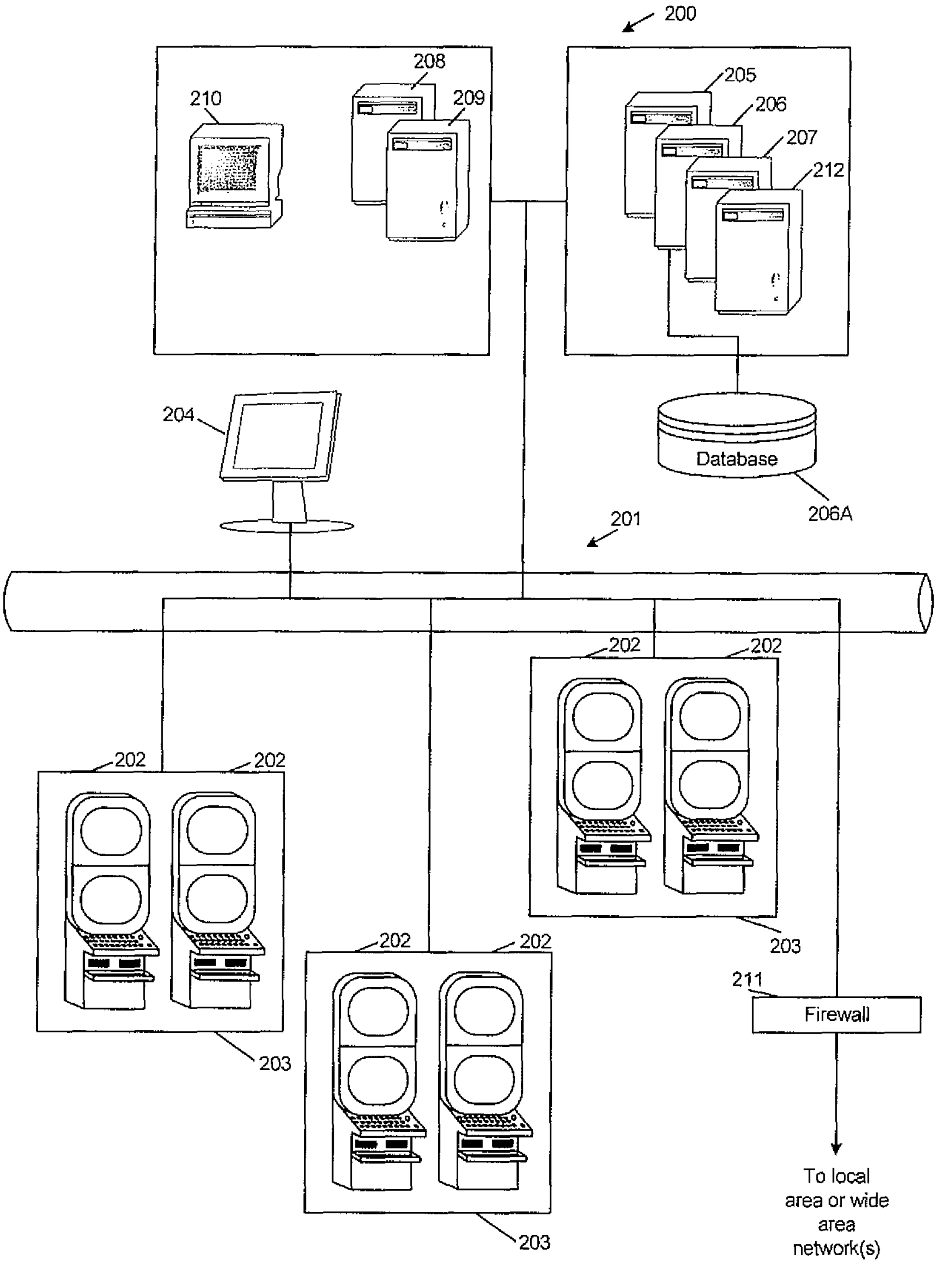
FIG. 5 is a schematic diagram of a network gaming system according to an embodiment of the invention.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 202, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game. Additional servers 212 may be provided to implement other functions depending on the embodiment implemented for the gaming venue.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Figure 8:
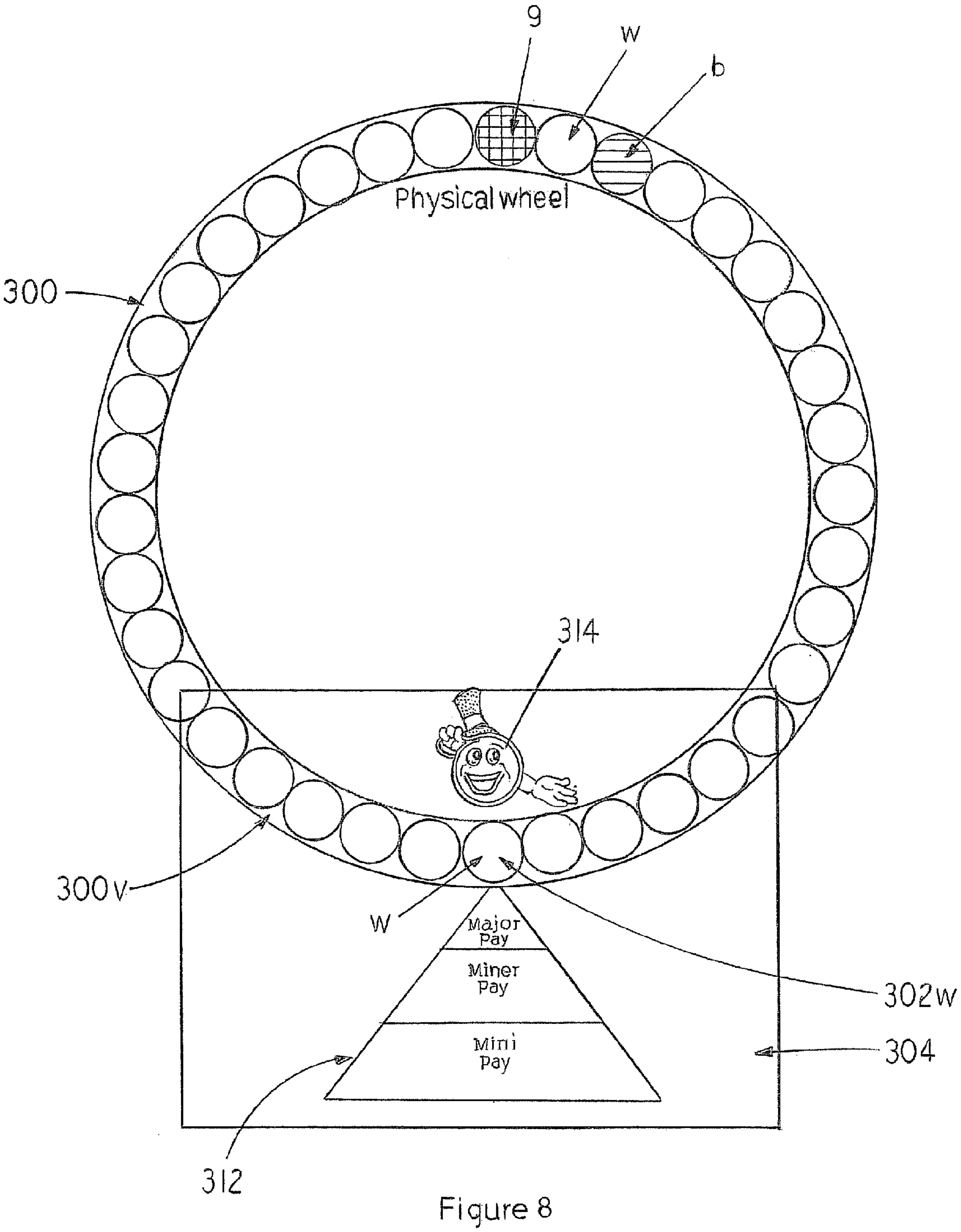
FIG. 8 is a schematic diagram of the visual display according to an embodiment of the invention.

FIGS. 6, 7 and 8 illustrate an embodiment of a gaming machine wherein the mechanical aspect of the gaming machine 202 is an enclosure in the form of a transparent ring tube 300 mounted vertically on the top box 26. A number of physical objects are free to move inside ring tube 300. In this embodiment the objects are balls 302 aligned in single file inside the tube 300 to form a ring of balls which can be propelled, by pneumatic bursts, mechanical drive or other means, to spin the ring of balls around the tube 300 and give the impression of a 'spinning wheel' game or 'roulette wheel' game.

In one embodiment the mechanism for propelling the balls may cause the balls to change direction within the tube so that the 'spinning wheel' appears to rotate backward as if tensioning a spring which is then released to propel forward.

While the ring of balls 302 can spin continuously within the tube 300, part of the tube is hidden from the sight of a user of the gaming machine by the top box 26 which in this embodiment supports a secondary display in the form of a screen 304. Screen 304 is a video display unit that may be a cathode ray tube, liquid crystal display or a plasma display.

Screen 304 is adapted to show information regarding the physical objects located in the mechanical aspect of the gaming machine 202. Specific to the embodiment illustrated, information regarding the physical balls 302, including the colour of the ball and/or the ball number, is communicated to the game controller 60 which processes the information to display on screen 304 a virtual image of the balls 302 that are hidden from view.

As best illustrated in FIG. 7, screen 304 illustrates a virtual representation (300*v*) of part of ring tube 300 and virtual representations (302*v*) of the colours and numbers of the hidden balls inside the virtual ring 300*v* in the same order they physically appear in the ring. This gives the appearance that the physical balls have moved onto the screen as they have spun around the ring. The entire ring of balls is represented in a physical and virtual combination.

It is understood that instead of the balls being propelled to move within tube ring 300, the balls 302 may remain still within the ring and the tube ring itself may be driven to spin relative to the gaming machine.

The virtual balls 302*v* can be displayed when the spinning ring of physical balls 302 comes to rest or even while the ring is spinning, what is displayed may depend on the speed at which the balls are spinning, for example the balls may be shown as "blurred" in the same manner a virtual reel is simulated as spinning when the balls move quickly. The physical balls 302 illustrated in FIG. 7 do not bear number markings. It is understood to persons skilled in the art that numbers may be assigned to the virtual balls 302*v* only, to the physical balls 302 only or to both the virtual and physical balls.

During game play one of the balls 302*w* may be selected as the 'winning ball'. A winning ball may be determined according to the resting position of the ball when the ring 300, 300*v* stops spinning. FIG. 8 illustrates a physical/virtual ring of balls whereby each ball is identified by colour only, namely the colours white w, blue b and gold g. On the screen 304 is a pyramid 312 that points to the position of the lowest ball 302*w* in the virtual ring tube 300*v*, which the game has determined to be the selected winning position. The pyramid 312 points to the winning ball 302*w*. The virtual winning ball has a corresponding physical ball located at the same position in the ring 300 of balls but out of view.

Game play and pay prizes can be determined by the colour of the winning ball where, for example, one colour pays out a prize of greater value than another colour. Additional game play parameters can also be introduced such as a figurine 314 displayed on screen 304 which flips between upside down (tails) and right way up (heads) positions as the ring of balls spins. The resting position of the figurine, heads or tails, determines an additional dimension of game play, for example, the level of pay to a user: mini, minor or major.

The above described embodiments rely on the game controller recognizing which physical balls are hidden from view and which physical/virtual balls land in the winning position. This is achieved by the gaming system comprising a reader that identifies a physical object from a plurality of physical objects and communicates data, or information, regarding that object to the game controller which can then use that information to display an outcome or as a parameter in game play.

Figure 9:
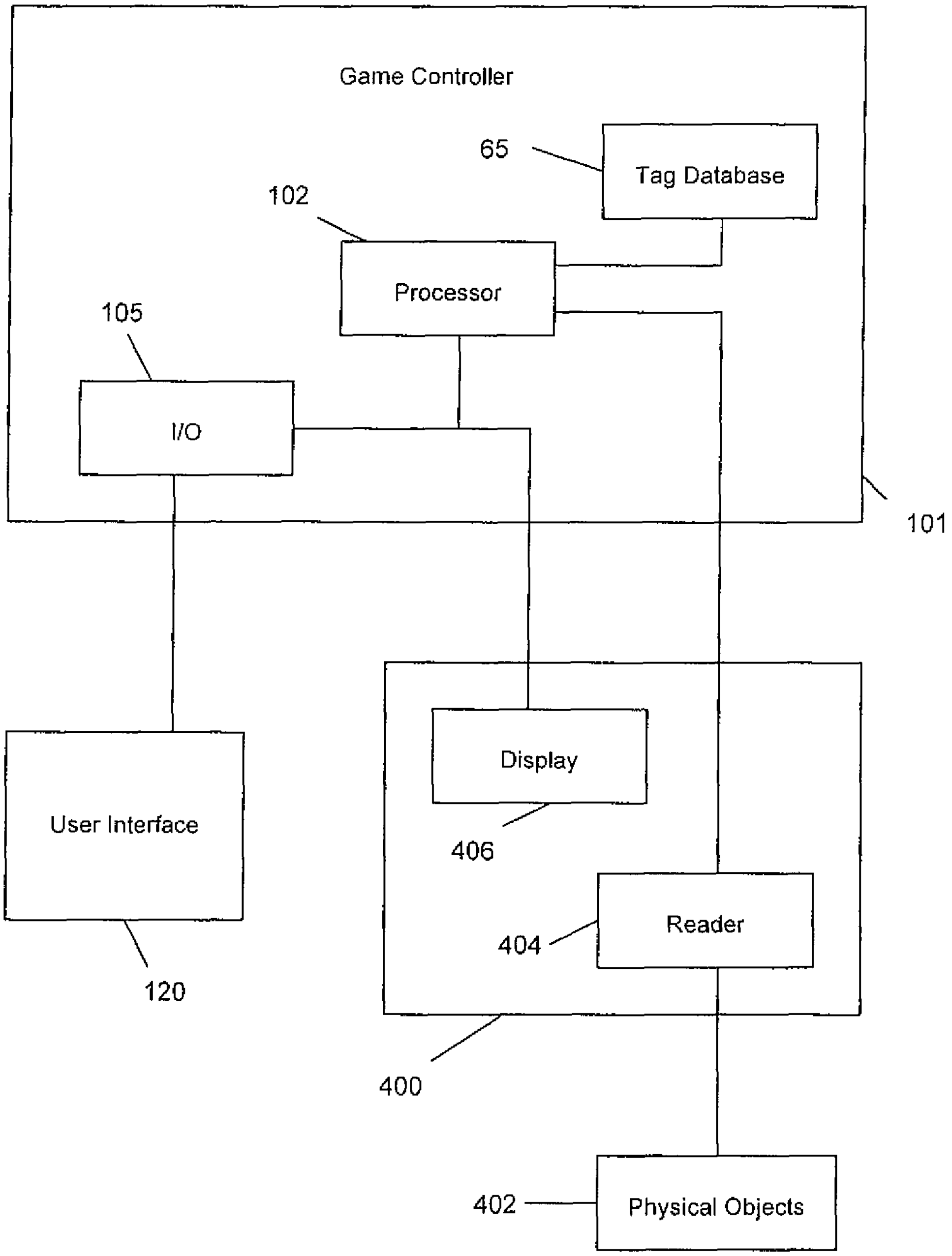
FIG. 9 is a block diagram of the functional components of a gaming machine according to an embodiment of the invention.

FIG. 9 illustrates a block diagram of the operating components of an embodiment of the present invention. The core components of a game controller 101 with processor 102 and input/output interface 105, and user interface 120 are present. Other standard components of the game controller 101 and user interface 120 that are illustrated in FIG. 3 are present in relation to the embodiment of FIG. 9 but are not shown in FIG. 9. In addition to the game controller 101 and user interface 120 a mechanical interface 400 is provided between physical objects 402 and game controller 101. Mechanical interface 400 comprises a reader 404 that is in communication with processor 102. Information regarding the physical objects is processed by the processor 102 and displayed electronically on display 406.

In one embodiment the reader 404 is a Radio Frequency Identification (RFID) reader and each physical object carries a transponder that transmits a signal unique to that object. The reader includes a microcontroller (not shown) and a magnetic loop antenna (not shown) operating at RFID frequency. The transponder is specifically a passive RFID tag (not shown), although it is foreseeable that a semi-passive or an active tag may be used.

In the above embodiment of the spinning ring of balls, the balls are hollow and each ball contains RFID tag components, namely an antenna and an integrated circuit. An incoming radio frequency signal provides sufficient power for the integrated circuit to transmit a response signal encoded with a unique code.

Each RFID tag is mapped in a tag database 65, which is in data communication with processor 102. Each RFID tag is mapped against the colour, alpha numeral, or other identifying feature of the physical object such that on receipt of a specific coded signal the processor is able to identify which physical object has been read. For example, the pyramid 312 in FIG. 8 points to a white ball that has come to rest as the winning ball 302*w*. Winning ball 302*w* internally carries an RFID tag coded with a unique code that is transmitted as a signal. When the reader 404 receives a signal from ball 302*w* and passes the signal on to the game controller, the unique code is found on tag database 65 as belonging to a white ball.

Game controller 60 then generates a virtual representation 302*w* of a white ball for display on screen 304. Given the computer processing speeds involved in reading the physical objects, processing and displaying the information, the virtual winning white ball 302*w* appears on screen 304 simultaneously, or almost simultaneously, as the physical wining white ball 302*w* comes to rest in the winning position.

Game controller 60 may also or alternatively use the information that a white ball has been during game play, for example to determine an outcome or award a prize.

So that the hidden physical balls in the lower part of ring tube 300 can be virtually shown on the screen 304, the reader may simultaneously read multiple physical balls. In one embodiment the reader would be located in the vicinity behind the screen and sufficiently near to the lower part of the ring tube to enable the physical balls to read.

Alternatively, the game controller could have a map of the order of balls 302 in the ring tube 300. In this case each unique code associated with a coloured ball would be mapped with an additional identifier to distinguish one coloured ball from another ball of the same colour. For example, if the winning ball is identified as "White 6", by consulting the map of ball order the game controller can calculate that the three balls to the left of the winning white ball 302*w*, closest to furthest (as shown in FIG. 8), are "white", "white" and "blue", while the three balls to the right of the winning ball 302*w* are, closest to furthest, "blue", "white" and "white". This order can then be displayed.

The reader 404 can also track the location of a ball by repeatedly sending and receiving signals to a particular ball. A series of location points for that ball can then be mapped by the controller to determine its position, and predict future positions if the movements are regular enough.

In the above embodiment, selection of a winning ball relies on the random propulsion of the spinning ring of balls. In an advanced embodiment it is envisaged that the random selector of the gaming machine is not the spinning ring of balls but is instead a random number generator. A winning ball can be preselected by the random number generator, tracked and the spinning ring of balls could be mechanically controlled to stop spinning to bring the selected winning ball into the winning position.

To prevent external interference of the RFID method of communication and possible breach of security, the balls 302 are provided with radio frequency shielding to obstruct external interference. Shielding from external interference is provided by a metallic mesh surrounding each RFID tag in each ball to provide a faraday cage.

In an alternative embodiment the reader does not rely on RFID technology but is instead a camera that identifies a ball by reading its external physical appearance and forwarding that information to the game controller. Using again the arrangement illustrated in FIG. 8 as an example, a camera (not shown) could be suitably placed to obtain images of the physical balls hidden by screen 304. Using image processing software information regarding the colour, size, markings, etc. of the object can be obtained from images obtained by the camera and conveyed to the game controller 60 for displaying virtually or for use in game play.

Figure 10A:
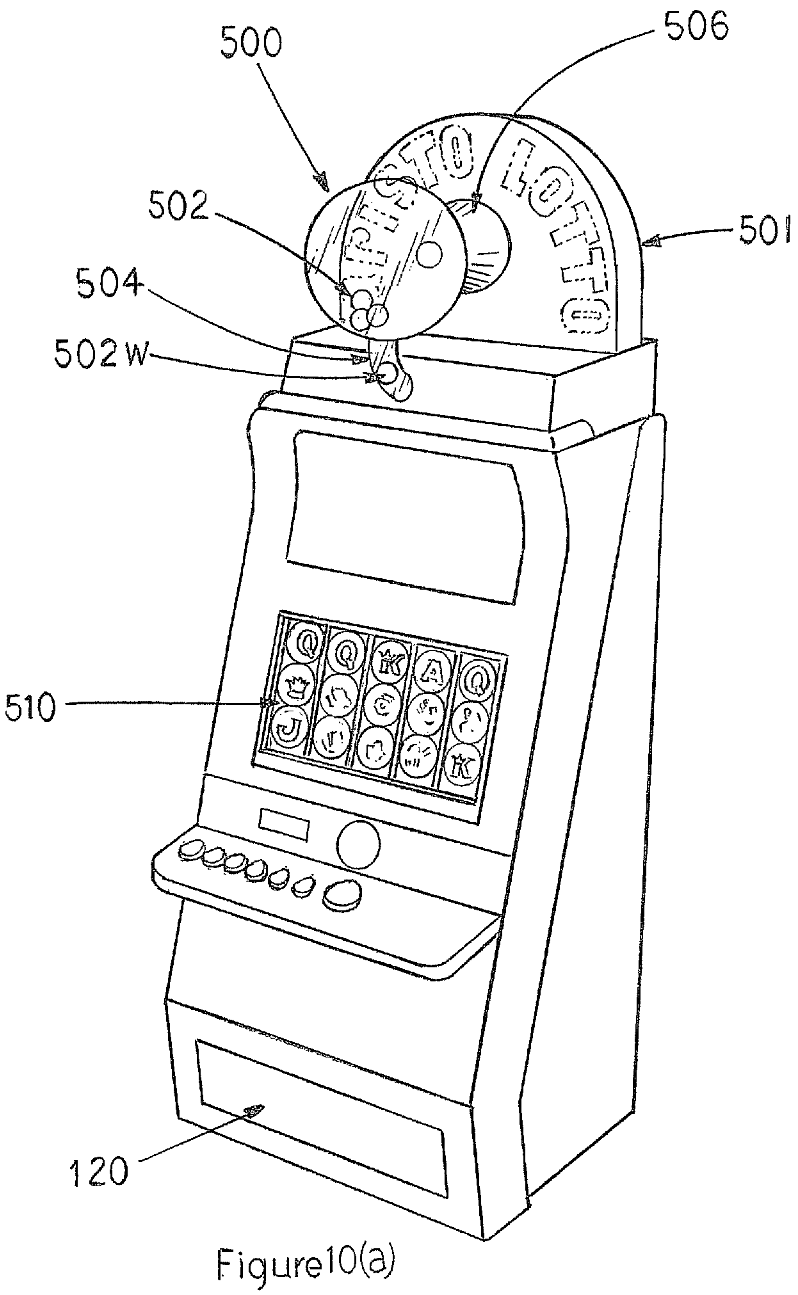
FIG. 10(*a*) is an isometric view of a gaming machine according to an embodiment of the invention.
Figure 10B:
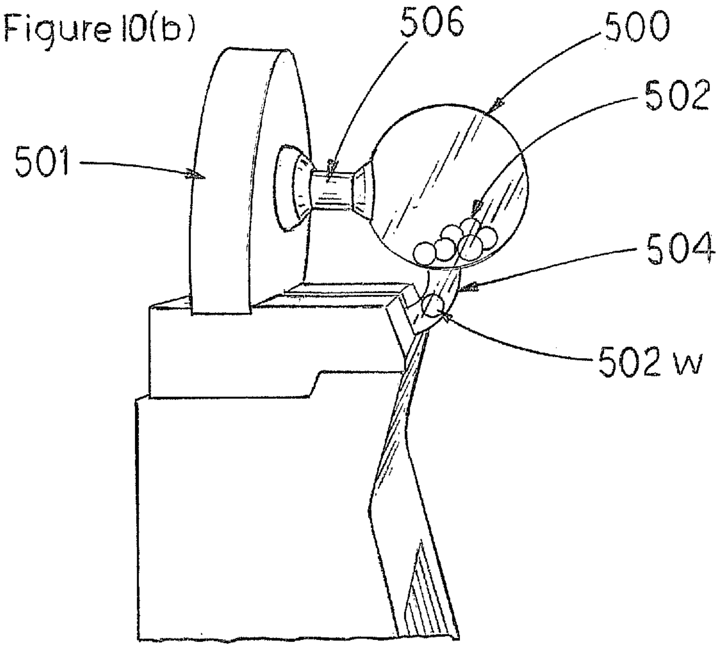

FIGS. 10(*a*) and 10(*b*) illustrate another embodiment of integrating a physical aspect with the electronic aspect of a gaming machine. This embodiment implements a lotto, or Keno, attachment on top of a gaming machine. The physical objects in the form of balls 502 are contained in a spherical transparent lotto container 500 mounted in front of a back panel 501. The balls 502 are made to agitate randomly within the container 500 by flowing jets of air upwardly into the container.

A winning ball 502*w* is selected when the jet of air stops and the first ball to drop into a transparent chute 504 at the bottom of the container 500 is the winning ball 502*w*. Transparent chute 504 leads into the interior of the gaming machine. Winning ball 502*w* can either remain stationary within chute 504 for an amount of time or may roll directly into the gaming machine interior. Balls 502 are returned into the container 500 from the interior of the gaming machine through back panel 501 and through an inlet 506 to drop the balls back into the container.

Figure 11:
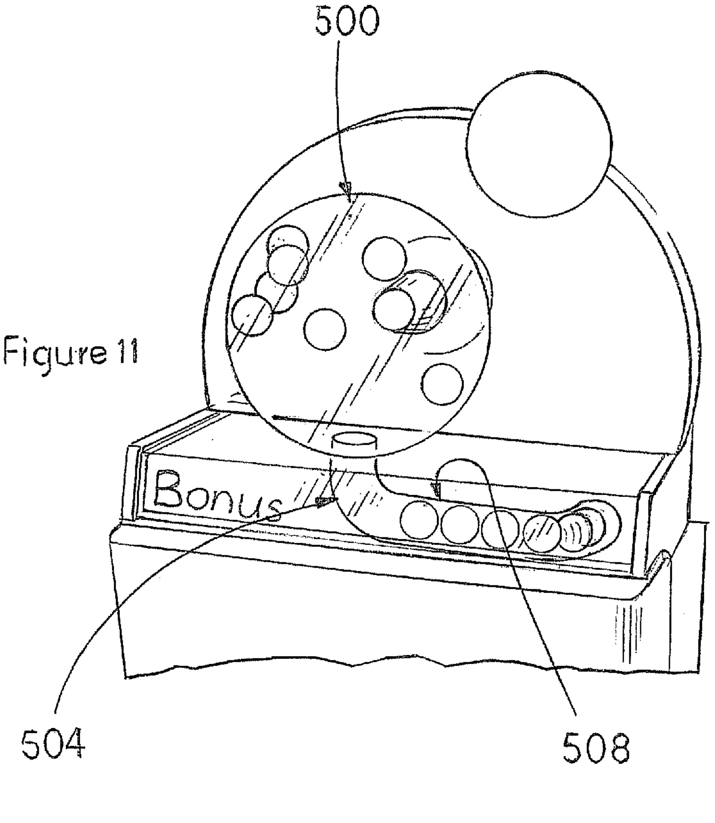
FIG. 11 is an enlarged view of an upper part of a gaming machine in accordance with an alternate embodiment of that of FIGS. 10(*a*) and 10(*b*)

FIG. 11 illustrates an alternative embodiment of the lotto attachment where chute 504 comprises a horizontal extension 508 for collecting selected balls and allowing them to be viewed before depositing the selected balls into the gaming machine interior. To prevent balls from unintentionally entering chute 504 a valve (not shown) may be provided at the chute entrance at the bottom of container 500. Alternatively chute 504 may be designed to have a length that only supports the desired number of selected balls.

To determine which ball(s) has dropped into chute 504, that is, has been selected as a winning ball, a similar system to that described above in relation to FIGS. 6 to 9 is used. Namely, each ball contains an RFID tag which transmits a signal particular to that ball such that an RFID reader receiving that particular signal forwards data relating to that signal to the game controller where the ball selected can be identified. Alternatively, a camera can be used to visually identify selected balls in which case there would be no need for each ball to carry an RFID tag.

As in the embodiment of FIGS. 6 to 9, once the ball has been identified game controller can use the information. The information displayed on a screen can include: characteristics of the winning ball(s), namely colour, number, etc.; consequences of the ball being selected—"Number 15 wins $10"; or a virtual representation of the winning ball.

The information regarding the winning ball(s) can alternatively or additionally be used during game play, for example to trigger a bonus game, additional prize or other game feature. In one embodiment the gaming machine spinning reels 510 (FIG. 10*a*) may include vacant positions, or may be entirely empty transparent reel tubes, that can be filled with physical balls 502 selected from the lotto container and transferred through chute 504 to fill the vacant positions in the reels. The balls themselves then adopt the role of gaming symbols usually printed on the surface of spinning reels to form game sequences when the reels spin to a stop position.

In this embodiment the RFID reader is also capable of reading and distinguishing balls when they fall into position in the vacant reels.

It is understood that while the description refers to balls as the physical objects carrying identifiers in the form of RFID tags and/or physical external markings, the physical objects may take many different forms, such as coins, characters, or any objects that are able to move around within, or with, an enclosure and to carry identifying information.

Figure 12:
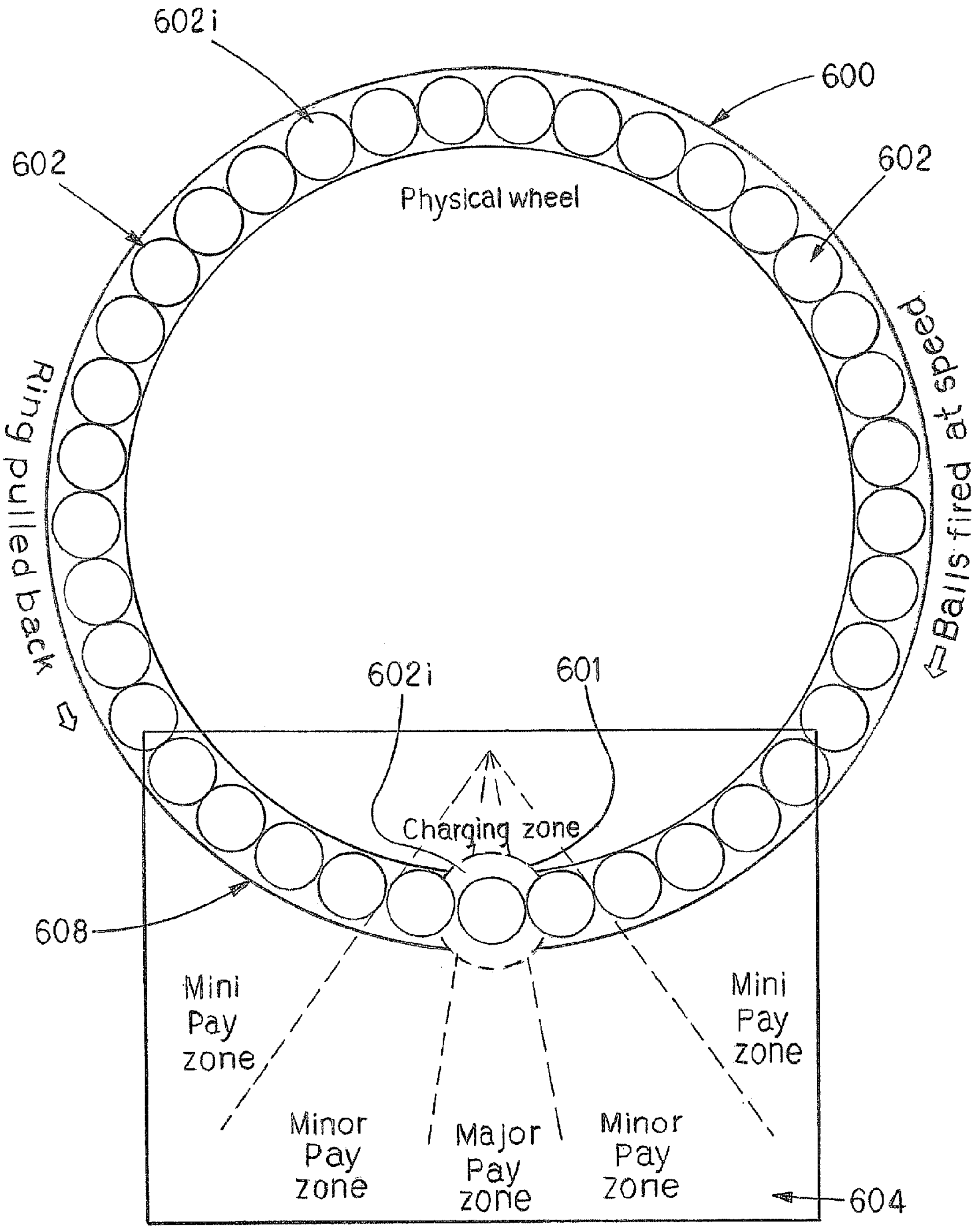
FIG. 12 is a schematic diagram of the visual display according to yet another embodiment of the invention.
Figure 14A:
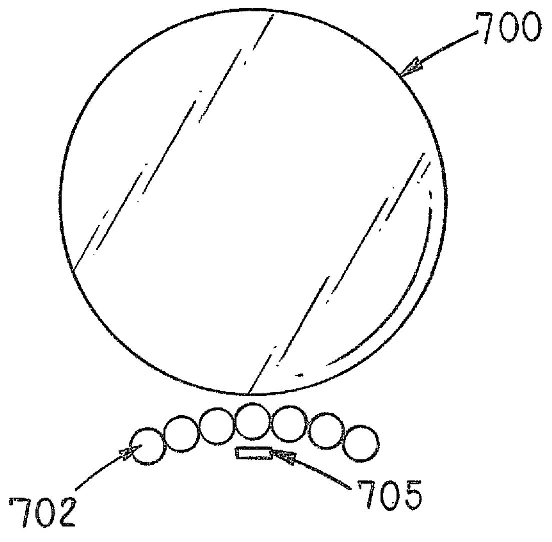
FIGS. 14(*a*), 14(*b*) and 14(*c*) are schematic diagrams of the visual display illustrating steps in charging an object according to another embodiment of the invention.
Figure 14B:
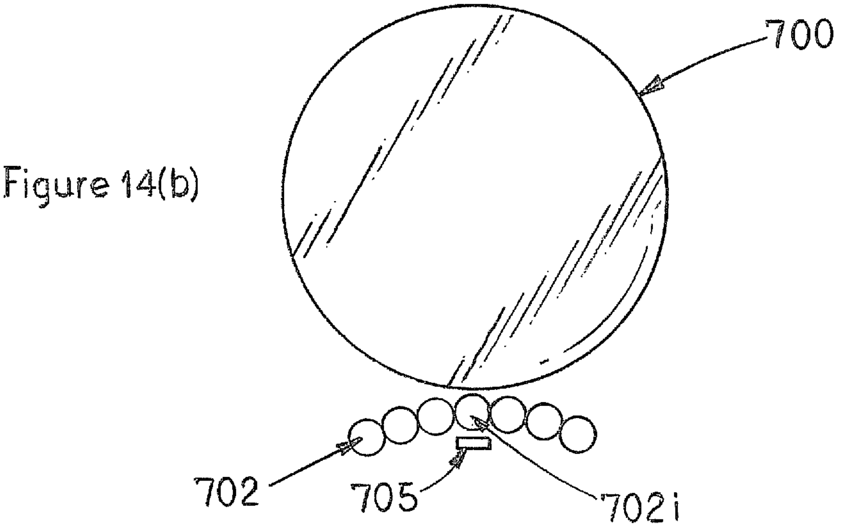
Figure 14C:
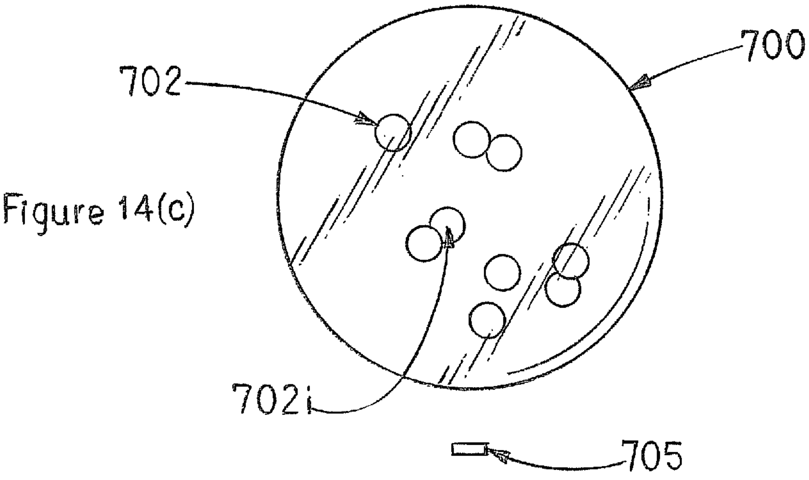

FIGS. 12 to 14(*c*) illustrate another embodiment where a physical aspect of a gaming machine is incorporated with the electronic aspect in which a physical object is made to change physical appearance for a period of time before the object is returned to its original appearance. One method of changing the appearance is to illuminate an object to make it stand out from other objects.

FIGS. 12, 13(*a*), 13(*b*) and 13(*c*) show a ring tube 600 containing balls 602 similar to the above example of the 'spinning wheel' game. In this embodiment, one or more balls 602*i* are illuminated by applying a charge to the ball. Illumination of the ball 602*i* could be achieved in one embodiment by installing a Light Emitting Diode (LED) or other light emitting device inside the ball, which has a translucent plastic shell through which light is diffused, and activating the LED to illuminate the ball.

The electronics required to illuminate the ball 602*i* include: a light (such as an LED), and an inductive circuit adapted to extract energy from a received signal to power the light. Inductive circuit typically includes an antenna for receiving the signal. All these electronics are housed inside the ball, or inside any other physical object to be illuminated.

The ball is remotely illuminated as it nears a charge transmitter that is transmitting a signal. Turning to FIGS. 12, 13(*a*), 13(*b*) and 13(*c*) for example, a charge transmitter (not shown) is operational within the charging zone 601 of the spinning ring of balls 602. In one example, an antenna of the charge transmitter may be highly directional such that the ball 602*i* closest to the charge transmitter illuminates. In another example, each ball may have an individual identifier and inductive circuit may include a processing section which determines whether an identifier in the transmitted signal matches a stored identifier such that it only provides power to the light when the identifiers match.

The illuminated ball 602*i* continues spinning within the ring of balls until the spinning ring slows to a stop. Another ball 602*i* may be illuminated before the spinning ring stops. FIG. 12 shows a screen 604 illustrating a 'major pay zone', a 'minor pay zone' and a 'mini pay zone' at a bottom part of a virtual ring 608 corresponding to the physical ring tube 600 with balls 602. If, when the spinning ring of balls stop, an illuminated ball 602*i* lands in one of the pay zones a bonus is added to the game play. The value of the bonus is dependent on which zone the illuminated ball 602*i* lands in.

Alternatively, a bonus may be awarded simply because a ball has been illuminated. The bonus award may vary in value depending on which ball has been illuminated, namely a specifically coloured ball or a ball having a particular number, letter or other marking.

FIGS. 13(*a*) to 13(*c*) illustrate the steps involved in charging a ball in the 'spinning wheel' game. FIG. 13(*a*) illustrates the balls moving in an anti-clockwise direction. All balls are in a normal state. A charge transmitter 605 applies a charge to one of the balls 602*i* in FIG. 13(*b*) as the ball passes through the charging zone 601. A further two balls 602*i* in the ring of balls are charged in FIG. 13(*c*) so that three balls are shown illuminated. The illuminated balls add value and variation to game play.

After a period of time, which can be predetermined, the illuminated balls lose their charge, dim and return to a normal state.

In another embodiment the balls do not simply illuminate but may pulsate, or change colour, or carry out some other visual effect to create interesting game play and/or to differentiate one illuminated ball from another.

In one embodiment the illuminating balls each also include an RFID tag. Incorporating RFID technology with remote illumination of balls allows a reader to identify which ball has been illuminated, for example, a 'white' ball or a number '15' ball. This information can then be used in game play. Taking this concept further, the game controller 60 can choose which ball to illuminate and then instruct the charge transmitter to emit a signal to be received by only the chosen ball, which in turn is then illuminated.

As has been illustrated above, combining RFID technology in game play together with the concept of changing the physical appearance of an object allows for an endless number of possible game plays and styles. Instead of RFID tag technology other forms of readers to identify an object may be used, for example, a camera to visually identify an object.

As illustrated in FIG. 12 the concept of illuminating balls in a 'spinning wheel' can also be combined with the concept of representing a virtual part of the spinning ring of balls on a screen 604. The illuminated ball 602*i*, as it nears screen 604 and becomes hidden from view, appears as a virtual representation of an illuminated ball on screen 604. Additionally, with the physical charging zone 601 located behind screen 604 the charge transmitter may be placed very close to the physical ring 600 without being visible to a player.

The concept of causing objects to appear differently can be applied to other types of games. FIGS. 14(*a*) to 14(*c*) illustrate the use of illuminating balls to differentiate them from other balls with the physical aspect of a 'lotto' attachment similar to that described in relation to FIGS. 10(*a*) and 10(*b*). In this embodiment at least one of balls 702*i*, is packed with electronics for receiving a signal to illuminate the ball. Before dispensing balls 702 into lotto container 700 a charge transmitter 705 transmits a charge to ball 702*i* to cause it to illuminate. The balls are then dispensed into lotto container 700 and agitated. Selecting illuminated ball 702*i* as the winning ball signifies a specific outcome in game play that would be different than if a non-illuminated ball was selected. More than one ball may be illuminated. In another embodiment the ball could be illuminated after it is dispensed into the lotto container.

In a simplest form of the game, game controller 60 determines if a ball, or how many balls, are illuminated and uses this information in game play. In a more complex form, and in combination with RFID tag technology, game controller can determine which ball(s) has been highlighted/illuminated and/or predetermine which ball(s) to highlight/illuminate.

Illumination of objects is not the only manner of causing the appearance of an object to be altered or distinguished from other objects. Another manner is to change the colour of an object or to cause a symbol or other marking to appear on the object.

For example, an object, such as a ball, may be coated with a chemical coating that when exposed to certain conditions, such as heat or ultra violet (UV) light, changes colour. As the surface coating cools the object returns to its original colour. In this example an infra red camera or a visual camera could be used to identify the location and markings of a 'hot' ball or a ball that has changed colour.

It need not necessarily be the entire surface of the object that is coated with a heat sensitive or UV light sensitive composition. A marking, such as a letter or number, may be imprinted on the surface in the sensitive composition so that when exposed to the sensitive conditions the marking 'appears' on the object.

The above described methods of game play and gaming machines are some examples of how a physical aspect of a gamine machine, such as a ring of balls or lotto container, can interact with the electronic aspect and controls of the gaming machine. A person skilled in the art should appreciate that the physical aspect may vary in form and game style suffice that an occurrence with the physical aspect affects the electronic aspect of the gaming machine.

In the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

It is to be understood that, if any prior art is referred to herein, such reference does not constitute an admission that the publication forms a part of the common general knowledge in the art, in any country.

The invention claimed is:

1. A gaming system comprising:

a game controller;

an electronic display;

a mechanical enclosure coupled to the electronic display and which contains a plurality of physical objects capable of movement within the mechanical enclosure, wherein at least a portion of the mechanical enclosure is hidden behind the electronic display; and a reader that identifies an object from the plurality of objects and communicates data regarding that object to the game controller, wherein the game controller uses the data to create a virtual image of the object on the electronic display when the object is located in the hidden portion of the mechanical enclosure behind the electronic display, and wherein the game controller further uses the data to create an animation of the virtual image upon the electronic display mimicking the movement of the object as it moves within the hidden portion of the mechanical enclosure.

2. The gaming system claimed in claim 1, wherein each object of the plurality of objects comprises an identifier that is readable by the reader and from which each object may be identified.

3. The gaming system claimed in claim 2, wherein the identifier is a transponder carried by the object, wherein the transponder transmits a signal unique to the object.

4. The gaming system claimed in claim 3, wherein the transponder is a passive RFID tag.

5. The gaming system claimed in claim 4, wherein each of the plurality of objects comprise radio frequency shielding to obstruct external interference while also allowing the reader to identify the object.

6. The gaming system claimed in claim 5, wherein the shielding is a metallic mesh surrounding the RFID tag.

7. The gaming system claimed in claim 1, wherein the reader is capable of simultaneously identifying multiple objects.

8. The gaming system claimed in claim 1, wherein the reader is capable of tracking movement of an object.

9. The gaming system claimed in claim 1, wherein the reader comprises a microcontroller and a magnetic loop antenna, wherein the magnetic loop antenna is configured to operate at RFID frequency.

10. The gaming system claimed in claim 1, wherein the reader comprises a camera that visually identifies an object using a distinctive marking on the object.

11. The gaming system claimed in claim 1, wherein the object is a hollow ball marked with alphanumeric characters and/or is coloured.

12. The gaming system claimed in claim 1, wherein the objects move randomly within the mechanical enclosure.

13. The gaming system claimed in claim 1, wherein the mechanical enclosure is a transparent ring around which the objects are propelled in single file.

14. The gaming system claimed in claim 1, wherein the mechanical enclosure is a transparent ring and the plurality of objects are linearly packed within the ring, the transparent ring being capable of rotating relative to the mechanical enclosure to thereby move the plurality of objects relative to the mechanical enclosure.

15. The gaming system claimed in claim 1, wherein the mechanical enclosure is a transparent container in which the objects are randomly jumbled.

16. The gaming system claimed in claim 1, wherein a random number generator pre-determines an object to be selected, the reader identifies the location of the object to be selected and the object is moved to a predetermined location.

17. The gaming system claimed in claim 1, wherein, in use, a physical object moves into the hidden portion of the mechanical enclosure, the corresponding virtual image of that physical object appears on the display.

18. A method of gaming comprising:

moving a plurality of marked physical objects within a mechanical enclosure coupled to an electronic display on housing of a gaming machine, wherein at least a portion of the mechanical enclosure is hidden behind the electronic display; and reading an identifier of a given physical object of the plurality of marked physical objects to obtain data that distinguishes the given physical object from other ones of the plurality of marked physical objects;

generating a virtual image of the given physical object on the electronic display using the data corresponding to the given physical object when the given physical object is located in the hidden portion of the mechanical enclosure; and using the data corresponding to the given physical object so that the virtual image of the given physical object is animated and further mimics movement of the given physical object as it moves within the hidden portion of the mechanical enclosure.

19. The method claimed in claim 18, wherein the markings of the plurality of marked physical objects comprise radio frequency identifiers, and wherein the reading of the identifier of the given physical object comprises using radio-frequency identification to identify the given physical object.

20. The method claimed in claim 19, further comprising shielding the plurality of marked physical objects against external interference.

21. The method claimed in claim 18, wherein the markings of the plurality of marked physical objects comprise visual indicia, and wherein the reading of the identifier of the given marked physical object comprises detecting the visual indicia using a camera.

22. The method claimed in claim 18, including introducing the data obtained from the object read as a variable in game play.

23. A gaming system comprising:

a game controller;

an electronic display;

a mechanical enclosure coupled to the electronic display and which contains a plurality of physical objects capable of movement within the mechanical enclosure, wherein at least a portion of the mechanical enclosure is hidden behind the electronic display; and a reader that identifies a physical object to be differentiated from the plurality of objects located in the hidden portion of the mechanical enclosure, wherein the reader communicates information regarding that physical object to the game controller such that the object can be differentiated from other objects of the plurality of objects, wherein the game controller uses the communicated information to create a virtual image of that physical object on the electronic display, and wherein the game controller further uses the communicated information to create an animation of the virtual image on the electronic display that mimics the movement of the physical object as it moves within the hidden portion of the mechanical enclosure.

* * * * *